| (12) | United States Patent | (10) Patent No.: | US 10,463,189 B2 |
|---|---|---|---|
| | Conrady et al. | (45) Date of Patent: | Nov. 5, 2019 |

(54) COFFEE MACHINE FOR PORTION CAPSULES

(71) Applicant: Qbo Coffee GmbH, Wallisellen (CH)

(72) Inventors: Tobias Conrady, Hamburg (DE); Claudio Foscan, Rapperswil-Jona (CH)

(73) Assignee: QBO COFFEE GMBH, Wallisellen (CH)

( * ) Notice: Subject to any disclaimer, the term of this patent is extended or adjusted under 35 U.S.C. 154(b) by 221 days.

(21) Appl. No.: 15/311,869

(22) PCT Filed: May 19, 2015

(86) PCT No.: PCT/CH2015/000078
§ 371 (c)(1),
(2) Date: Nov. 17, 2016

(87) PCT Pub. No.: WO2015/176191
PCT Pub. Date: Nov. 26, 2015

(65) Prior Publication Data
US 2017/0079463 A1    Mar. 23, 2017

(30) Foreign Application Priority Data

May 21, 2014   (EP) ..................................... 14169279

(51) Int. Cl.
*A47J 31/36*        (2006.01)
*A47J 31/46*        (2006.01)
(Continued)

(52) U.S. Cl.
CPC .............. *A47J 31/3623* (2013.01); *A23F 5/26* (2013.01); *A47J 31/46* (2013.01); *A47J 31/52* (2013.01); *A47J 31/56* (2013.01)

(58) Field of Classification Search
CPC ........ A47J 31/36; A47J 31/3623; A47J 31/46; A47J 31/56; A47J 31/52; A23F 5/26
See application file for complete search history.

(56) References Cited

U.S. PATENT DOCUMENTS 5,325,765 A * 7/1994 Sylvan ................ A47J 31/0673
                                                     426/433
8,973,435 B2 * 3/2015 Preston .................... A47J 31/52
                                                      73/202
(Continued)

FOREIGN PATENT DOCUMENTS

EP     1 510 160     3/2005
EP     1 676 509     7/2006
(Continued)

OTHER PUBLICATIONS

English translation of the International Preliminary Report on Patentability dated Nov. 22, 2016, Application No. PCT/CH2015/000078.

*Primary Examiner* — Viren A Thakur
*Assistant Examiner* — Chaim A Smith
(74) *Attorney, Agent, or Firm* — Rankin, Hill & Clark LLP

(57) ABSTRACT

An extraction appliance with a brewing module for forming a brewing chamber for a portion capsule, with a water feed comprising a pump and a water heater for feeding water under pressure to the brewing chamber. The extraction appliance includes a control for the pump that can be integrated into the pump or be present at least partly externally of the pump, as well as a device for measuring the fluid flow into the brewing chamber. The control is configured such that a pump power of the pump is dependent on the fluid flow, and specifically such that given a lower fluid flow, the pump power is reduced in comparison to a greater fluid flow.

12 Claims, 4 Drawing Sheets

(51) Int. Cl.
     *A47J 31/52*     (2006.01)
     *A47J 31/56*     (2006.01)
     *A23F 5/26*      (2006.01)

(56) References Cited

U.S. PATENT DOCUMENTS

| | | | |
|---|---|---|---|
| 2004/0188459 A1* | 9/2004 | Halliday | A47J 31/0673 |
| | | | 222/83 |
| 2006/0096465 A1 | 5/2006 | Hu et al. | |
| 2008/0245236 A1* | 10/2008 | Ternite | A47J 31/0668 |
| | | | 99/295 |
| 2011/0132925 A1* | 6/2011 | Ozanne | F04B 17/04 |
| | | | 222/40 |

FOREIGN PATENT DOCUMENTS

| | | |
|---|---|---|
| EP | 2 273 117 | 1/2011 |
| EP | 2 850 980 | 3/2015 |
| EP | 2 889 223 | 7/2015 |
| EP | 2 899 225 | 7/2015 |
| JP | 2005-199070 | 7/2005 |
| JP | 2009-504344 | 2/2009 |
| JP | 2009-539447 | 11/2009 |
| JP | 2011-015953 | 1/2011 |
| WO | 2010/118543 | 10/2010 |

\* cited by examiner

COFFEE MACHINE FOR PORTION CAPSULES

BACKGROUND OF THE INVENTION

Field of the Invention

The invention relates to the field of extraction appliances for preparing drinks or likewise, from an extraction material contained in a capsule, for example ground coffee (coffee powder). In particular, it relates to a coffee machine.

Description of Related Art

Extraction appliances for preparing drinks or likewise from an extraction material that is present in a portion package amongst other things are known as coffee machines or espresso machines. In many corresponding systems, the portion packages are designed as capsules, in which the extraction material is sealed, for example in an airtight manner. For extraction, the capsule is pierced, for example at two sides that are opposite to one another. An extraction fluid, generally hot water, is introduced at the first side. The extraction product is discharged from the capsule at the second side.

The water must be introduced under a relatively large pressure into the capsule—the pump pressure is often between 15 and 20 bar—for the preparation of various types of coffee, in particular espresso, ristretto or espresso lungo (called cafe crème in Switzerland), and it is only with a sufficiently high brewing pressure that the so-called "crema" so popular amongst coffee enthusiasts can be formed.

On brewing however, with some capsules and indeed with finely ground coffee, it has been found that the flow—thus the volume flow of the fluid flowing into the capsule (and also flowing out of the capsule again, with the exception of a residual quantity remaining in this)—suddenly greatly drops and the user thus obtains an incomplete coffee given a predefined brewing time. This is annoying. Although it would be possible to control the coffee machine such that the brewing procedure continues to be carried out until the defined fluid quantity has flowed through, this however, apart from leading to a greater loading of the pump, also leads to unsatisfactory results concerning the taste.

It would be desirable if an extraction appliance could be designed such that it includes means to ensure that a drink meeting the high quality demands can be brewed from a very high percentage of the used capsules, even given unavoidable fluctuations of capsule characteristics and/or conditions prevailing during the brewing process.

SUMMARY OF THE INVENTION

According to an aspect of the invention, an extraction appliance, in particular a coffee machine is provided for preparing a drink or likewise, as an extraction product. The appliance includes a brewing module for forming a brewing chamber for a portion capsule, with a water feed having a pump and in general also a water heater (boiler or instantaneous water heater), for feeding water under pressure to the brewing chamber. The extraction appliance moreover includes a control of at least the pump—and this control can be integrated into the pump or being present at least partly externally of the pump—as well as a means for measuring the fluid flow into the brewing chamber. According to the aspect of the invention, the control is configured such that a pump power of the pump is dependent on the fluid flow, at least under certain preconditions and this being such that the pump power is reduced in the case of a lower fluid flow, in comparison to a higher fluid flow.

This outlined procedure functions independently of whether the controlled variable of the pump (regulating variable) is the pump power itself or, for example, a speed or the pump pressure. What is essential is merely that the power, which effectively flows into the pump, is reduced given a lower fluid flow, and this is also the case given a control of such a variable other than the pump power itself.

This procedure is counter-intuitive. Normally, one would expect the power to be increased given too low a fluid flow, in order to increase the fluid flow again and bring it at least into the proximity of a setpoint, which is to say of a desired value.

However, it has been found that conditions with which a high pressure intensifies the throughflow resistance can result in systems with portion capsules. In the extreme case, the throughput can come to a complete standstill on account of this, when the maximum pump pressure is reached. This leads to a blockage in the case of conventional pump activation. The procedure according to the invention, with such conditions, permits the pressure in the brewing chamber to be reduced, and this counteracts the blockage.

FIG. 3a shows the temporal course of the pressure in the inside of a capsule (dashed line) and of the flow into the capsule (unbroken line), which are typically measured during a regular, functioning brewing process. The capsule is filled with water at the beginning of the brewing process. The flow is high. A counter-pressure arises as soon as the watered extraction material is pushed in the direction of the extraction side and/or swells. In an embodiment of the capsule and an extraction-side perforation device, the counter-pressure can also be intensified due to the fact that the run-out openings of the capsule are not yet opened with the inflow procedure, but only completely open by way of the pressure being built up. The flow and the pressure set in at a certain level and remain roughly constant during the remainder of the brewing time. With a very short brewing—for example for espressos—the brewing can also be completed before such a constant level has set in. The pressure that sets in, given an achievable pump pressure of 19 bar (typical coffee machine vibrating diaphragm pump), can lie at a value between 5 bar and 16 bar for example, depending on the capsule characteristics. The flow, which sets in after a certain time and then remains roughly constant is hereinafter called "normal flow".

FIG. 3b shows the situation given the occurrence of a blockage. The unbroken line in FIG. 3b also shows the temporal course of the flow, and the dashed line the course of the pressure. The parameters look the same in the initial phase and the capsule is filled with water. The resistance in the capsule however greatly increases during the course of the brewing. The brewing pressure increases practically up to a maximal pressure that can be achieved by the pump (pump pressure) and the flow continuously reduces. According to the state of the art, the pump is switched off below a certain flow limit or after a certain time, and the brewing is prematurely finished, even if the desired extraction product quantity has not yet been brewed, for reasons of safety and so as to prevent an overheating of the system. The applied capsule is wasted on account of this, and this can be quite annoying to the user.

These observed problems concerning too large a reduction of the flow and which sometimes occur can be explained by the interaction of the functioning manner of a portion capsule on the one hand and the swelling extraction material (in particular coffee powder) on the other hand. It is particularly the case that the channels, through which the fluid flows away out of the capsule, need to be dimensioned in a relatively small manner, so that the pressure in the capsule can be maintained. It can occur that the resistance that the extraction product must overcome on flowing away is somewhat higher, on account of the small fluctuations of the capsule characteristics, for example of the fineness of the grinding of the coffee power, which occur again and again. Self-reinforcing effects can then occur.

A first such possible effect is the formation of a bed of coffee at the extraction-side delimitation of the capsule due to the interaction of hot water, pressure and temperature, for example if the extraction product is ground comparatively finely. Such a coffee bed is no longer sufficiently permeable for a regular brewing. The flow speed drops due to further coffee powder being pressed into the coffee bed on account of the then increasing pressure in the capsule, and the brewing process comes to a standstill in the extreme case.

A further possible effect, which interacts with the first effect, relates to the formation of extraction openings in the portion capsule, in particular if this is formed from a comparatively tough material such as a plastic for example (polypropylene or likewise), which resists a formation of too large openings.

FIG. 4 by way of illustration shows an example of an extraction-side perforation device 12, which pierces a capsule on closure of the brewing chamber or due to the action of the increasing capsule inner pressure at the extraction side even after the closure, by which means the extraction product can be discharged. The perforation device, which is illustrated here, corresponds to that of the European patent application 13 185 359.0, which is expressly referred to here and the teaching of which is expressly incorporated herein by reference. The perforation device includes a base plate 102 and a plurality of extraction spikes 103 that project from the base plate into the inside of the brewing chamber. Each extraction spike has a main body, which here is pyramid-shaped and which tapers into a tip 105. Outwardly projecting, axial ribs 120 extend along the lateral surface 111. A passage opening 108 is formed in the base plate, in each case on both sides of the ribs.

The capsule wall after the piercing will then enclose the base (the lower part, for example to roughly the location, at which the rib thickness begins to taper upwards) of the extraction spikes 103 in a collared manner and will be pressed onto these spikes 103 by way of the inner pressure of the capsule. Thereby, a channel along the base of the ribs 120 remains free due to the angular cross section of these ribs, through which channel the extraction product can flow out of the capsule, into the passage openings and away through these.

FIG. 5 shows a cross-sectional representation of one of the ribs 120 with a capsule wall 21, which bears on this. The reference numeral 22 very schematically represents coffee powder that is present in the inside of the capsule, but in reality coffee powder is present essentially along the complete capsule wall 21. As is schematically represented by the double arrows, the inner pressure of the capsule presses the capsule wall onto the extraction spike. This reduces the cross-sectional area of the channels 140 to the passage openings, in particular if the capsule wall 21 becomes softer on account of the increased temperature due to the hot water. This effect, in the case of too high a pressure can additionally or alternatively lead to a blockage on account of the narrowing of the channels 140—depending on the nature of the capsule.

Combinations of these two effects can also result, particularly the pressing of a coffee bed against the capsule wall 21, said pressing for its part reducing the size of the channels 140, or the formation of a coffee bed at the entrance of the channels, which already reduce in size due to the pressure.

These effects are not dependent on the specific design of the extraction spikes, as is represented in FIG. 4. In contrast, they even result when channels for leading away the fluid, for example, run in grooves along the lateral surface 111 and/or through openings in the lateral surface, into the inside of the extraction spike. This is represented very schematically in FIGS. 6 and 7.

FIG. 6 shows a further example of an extraction-side perforation device 12, which pierces a capsule on closure of the brewing chamber or due to the effect of the increasing capsule inner pressure at the extraction side, even after the closure, by which means the extraction product can be discharged. This perforation device also includes a base plate 102 and a plurality of extraction spikes 103, which project from the base plate into the inside of the brewing chamber. Each extraction spike has a main body, which here is pyramid-shaped and tapers into a tip 105. Projections 130 extend along the lateral surface 111. Passage openings in the form of channel-like openings 140 are formed in the lateral surface, at the upper side of the projections in the respective extraction spikes 103.

A blockage can also result with these embodiments, the blockage occurring at a higher pressure due to the effect of the coffee bed, of a closure of the openings 140 on account of the capsule inner pressure or by a combination of the effects, which is illustrated in FIG. 7.

Moreover, the capsule inner pressure, in combination with friction, can prevent the entry of the opening in the capsule wall, the opening being produced by the tip 105, from sliding sufficiently far towards the base (in FIGS. 4 and 6 to the bottom), in order to release the entry of the channels (in FIG. 4 at the upper-side end of the ribs 120, in FIG. 6 at the upper-side end of the openings 140), wherein this is likewise the case with the most varied of designs of the extraction spikes.

If now, according to the procedure of the invention, the pump power and, as a result of this, the capsule inner pressure is reduced as a reaction to a blockage, then the channels 140 can enlarge on account of the reduced pressure. The movements in the capsule, which are associated with this can also loosen up a possibly existing bed of coffee. Moreover, the capsule wall can slide more easily along the respective perforation spike due the reduced friction, and thus release the entrance to the channels to an improved extent. The blockage is lifted.

There are various possibilities concerning the selection of the dependence of the regulating variable (pump power, speed, pressure, etc,) on the measured flow.

A first, simple option is the reduction of power on falling short of a flow threshold value: the power (or other regulating variable) is reduced from a first value to a second value, as soon as the flow has fallen short of a certain threshold value—for example by way of reduction by a factor $K_0$ which is different than 0, wherein $0<K_0<1$. One can envisage the regulating variable then remaining at the second value, until the extraction procedure (brewing procedure) is completed. The generalization onto more than one threshold value and the stepped adaptation of the regulating variable for example is also possible.

A second option is the provision of a continuous or also non-continuous correcting function (wherein a hysteretic behaviour can be envisaged at discontinuities as the case may be, if the function is non-continuous). The power (or other regulating variable) is then corrected by a correction factor K, wherein K is a function of the flow at least in an interval.

A series of possibilities results for the second option. A first, simple possibility is a step function, possibly with a hysteresis, so that a rapid to and fro switching cannot result. The regulating variable is then reduced to a second value, as soon as the flow has fallen short of a certain threshold value, similarly to the first option. However, in contrast to the first option, the regulating variable jumps back to the first value as soon as the flow has exceeded the threshold value or an upper threshold value lying somewhat above the threshold value. A generalization onto several steps is also possible with this possibility.

A second possibility for example is the provision of a value which changes continuously, for example linearly between 1 (inasmuch as the flow lies above an upper threshold value) and a minimal correction factor mF, with 0<mF<1, in dependence on the flow, wherein the correction factor can optionally be constant at mF, if the flow lies below a lower threshold value.

Instead of a linear function, another function can also be selected below an upper threshold value, for example a subdivision into several straight lines with different gradients, a non-linear function, etc.

According to a third possibility, the upper threshold value can also be done away with, and the regulating variable can follow a linear or non-linear characteristic line, which is dependent on the flow, wherein optionally one can even envisage the pump power reducing again from a certain, high flow. This does not contradict the concept of the invention, since what is essential as far as this is concerned is that given a flow in a certain range, the pump power is controlled such that it drops when the flow reduces.

The control can be configured such that the pump power is dependent on the flow as single measured variable characterising the brewing method (i.e. as the only measured variable which is determined during the brewing method and on account of which the pump power can still be adapted to the respective capsule during the brewing method). This does not exclude different brewing programs being able to be present for example, and the procedure being able to be dependent on the selected brewing program. For example, one can envisage the user being able to select manually between brewing programs, and the pump power, in the case of a lower (too low a) fluid throughput, only being reduced under the precondition that a certain brewing program, for example "espresso" or "ristretto" is selected, whereas this is not effected in the case of other brewing programs.

An automatic capsule recognition can also be envisaged instead of or additionally to a manual selection between brewing programs, and a selection of the brewing program is effected in dependence on characteristics of the recognised capsule. Such a capsule recognition, for example, can include each capsule being provided with a suitable—for example optical or magnetic—code, which is recognised by the extraction appliance. In particular, one can envisage the program with a reduction of the pump power in the case of a lower (too low a) fluid throughput being selected when the recognised capsule, for example, includes a particularly finely ground coffee or a larger quantity of coffee, or other coffee characteristics such as roasting degree, roasting time, fat content, humidity or mixture, which lead to an increased flow resistance.

The water feed can include a water tank, from which a water conduit leads via the pump and the water heater, to the brewing module. A direct connection to a cold water connection instead of a water tank should also not to be ruled out.

The means for measuring the flow can include a flow sensor (a flowmeter) that is arranged in the water conduit, for example upstream or also downstream of the pump and upstream of the water heater. An arrangement directly at the entrance to the brewing chamber is also not ruled out, even if this entails the possible disadvantage that the flow sensor then comes into contact with the hot water.

The means for measuring the flow can alternatively also be integrated directly in the pump. The relation between the power consumption and another parameter, for example a speed or oscillation frequency can for example also represent a measure of the flow.

Preferably no branching, via which a share of the fluid that is not known from the beginning is branched off, should be arranged between means for measuring the flow and the brewing chamber inasmuch, as these means are means not arranged directly at the entrance of the brewing chamber, i.e. no bypass across the brewing chamber for a part of the fluid should be present downstream of the flow sensor or of the pump, for example. A possibly present bypass nonetheless should be regulated such that the flow into the brewing chamber is able to be determined at least approximately despite this.

Various possibilities exist for the control of the pump power. With alternating current vibrating diaphragm pumps, as are widespread in appliances for preparing drinks, a power control can be provided in the form of a phase angle control. The activation via a variable frequency or speed is also possible. Further types of power control are not ruled out, amongst these the provision of an actuatable throttle upstream or downstream of the pump.

The extraction appliance can optionally be provided with an active temperature regulation. Such a regulation can make sense due to the fact that the flow is not constant and, with the application of an instantaneous water heater as a water heater, for example, its power should likewise not be simply constant under certain circumstances. An active temperature regulation, for example, can include a temperature measurement between the water heater and the brewing chamber or at the water heater itself.

The brewing module, as is known per se, can be designed as a horizontal brewing module, with which the capsule is inserted at a location which is envisaged for this (insert opening or likewise), whereupon the brewing chamber is closed by way of an operating lever for example, wherein the capsule is automatically removed from the brewing chamber and is ejected into a capsule container, with a renewed opening of the brewing chamber after the brewing procedure. The capsule insertion is thereby effected from above, the closure of the brewing chamber is a horizontal relative movement of two brewing module parts, the water flows essentially horizontally, and the capsule container is formed below the brewing chamber.

Other brewing module designs, for example, with brewing module parts that tilt to one another, with a brewing module part designed as a piston (particularly in a vertical arrangement) etc., are known and are suitable for extraction appliances according to the present invention.

The capsule in particular can include a capsule wall of plastic. A plastic that is considered is polypropylene. The capsule wall thickness can be between 0.1 and 0.6 mm, in particular between 0.2 mm and 0.5 mm or 0.4 mm. In embodiments, it can be designed in a manner corresponding to WO 2010/118543, to the European patent application 13 199 514.4 or according to 13 199 517.7.

Likewise the subject-matter of the present invention is a preparation system with an extraction appliance as well as a method for operating an extraction appliance.

BRIEF DESCRIPTION OF THE DRAWINGS

Embodiment examples are hereinafter described by way of drawings. The same reference numerals in the drawings indicate equal or analogous elements. The drawings may show elements that correspond to one another, but which partly are in different scales from figure to figure. There are shown in.

DETAILED DESCRIPTION OF THE INVENTION

Figure 1:
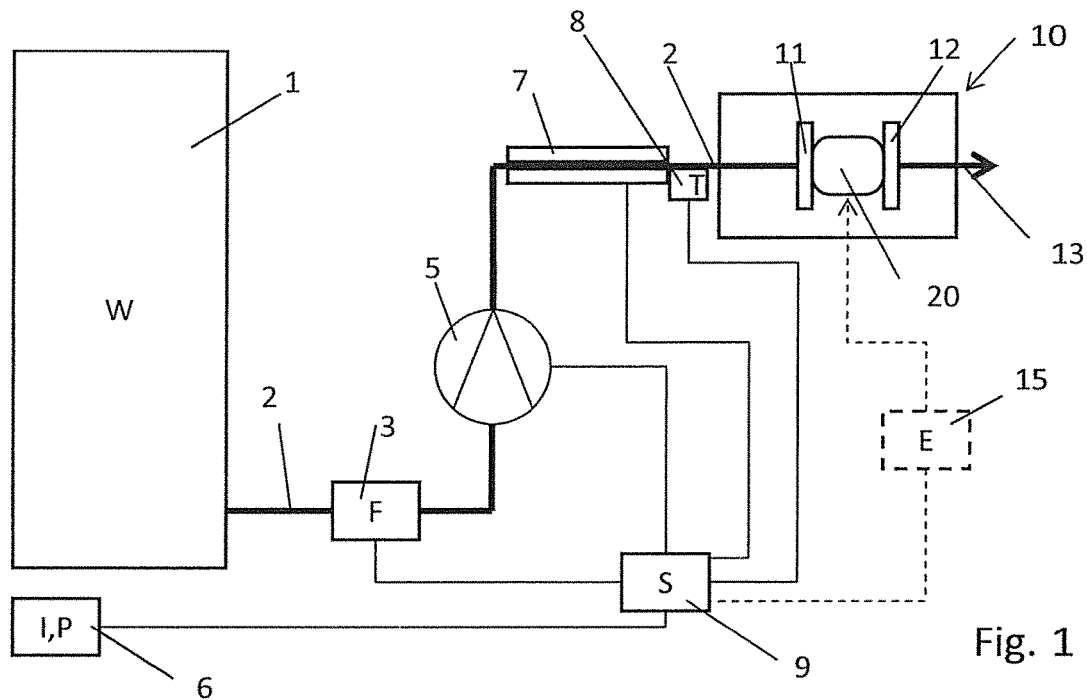
FIG. 1 a schematic diagram of an extraction appliance, in particular of a coffee machine.

FIG. 1 shows a schematic diagram of an extraction appliance, in particular of a coffee machine. The water feed includes a water tank 1 and a feed conduit 2 from the water tank to a brewing module 10. The water is delivered by a pump 5 and flows through a water heater—here drawn as an instantaneous water heater—before it flows into the brewing module. A flow sensor 3, which measures the flow of the water through the feed conduit, and, since the feed conduit 2 does not branch, thus also the flow into the brewing module 10, is arranged upstream of the pump.

The arrangement of the flow sensor in front of the pump has the advantage that the flow sensor is not arranged in the region which is under pressure and also not in the hot region. However, an arrangement downstream of the pump or even downstream of the water heater, in the throughflow direction, or in the water heater, is not to be ruled out a priori, in the case of a suitable design of the flow sensor. The integration of the flow sensor into the pump is also an option. At all events, it should be arranged such that the flow, which is measured by it, permits fluid flow into the brewing chamber formed given a closed brewing module and encompassing the capsule 20 to be determined. The fluid quantity flowing per unit of time is indicated as the fluid flow, represented, for example, as a volume or mass per unit time.

The brewing module, as is known per se, comprises an injector 11 for introducing water into a portion capsule 20, as well as a discharge device 12 (or extraction device) for discharging fluid out of the capsule into a pour-out 13.

A control 9 controls the pump 5, and possibly also the water heater. The flow values, which are measured by the flow sensor 3, as well as, as the case may be, the temperature values determined by an optional temperature sensor 8 serve as input variables for the control.

Such a temperature sensor 8, as is drawn, can be arranged in a manner, in which it is in contact with the feed conduit 2, subsequently to the water heater, in the water heater itself or on the water heater. The control can be configured such that it forms a control loop for the temperature, by way of the water heater being activated such that the temperature measured by the temperature sensor 8 always moves in a certain range. The inclusion of other readings, specifically of the measure flow. is also possible for the temperature regulation.

Further input variables can be led to the control 9 and influence this.

The extraction appliance, for example, can have an input module and/or programming module 6, via which a desired fluid quantity as well as, under certain circumstances, also the temperature and possibly also a desired pump power can be influenced.

A further possibility is the provision of a capsule recognition module 15, by way of which—for example by way of a suitable coding of the inserted portion capsule—the parameters characterising the capsule can be called up, for example information as to whether the capsule comprises finely ground coffee or coffee which in contrast is more coarsely ground.

Moreover, it is also possible for a pump overheating sensor (not represented in the figure) or further sensors or input possibilities to be present.

In embodiments, a manometer is not necessary, in order to influence the pump power, and generally such is also not present at all. One of the advantages of the procedure according to the invention is the fact that one can make do without such a relatively expensive and service-intensive element.

The pump activation can be directly or indirectly dependent on all these measured parameters. However, one preferably envisages the measured fluid flow being used as the sole measured variable, on account of which the control adapts the pump power during the brewing method. All other parameters, inasmuch as they have an influence on the pump activation, either effect a presetting (for example a desired fluid quantity or an "on/off" of the adaptive pump activation) or, if need be, a termination of the brewing method (for example actively by the user via the input module and/or programming module 6 or by way of a pump overheating protection etc.), but preferably not an adaptive activation of the pump power.

Possibilities, as to how the regulating variable can be dependent on the measured flow are yet sketched in FIGS. 2a to 2f. In each case, a correction factor K is plotted in dependence on the flow F in the figures. It is assumed that the following is valid for the pump power P: $P=P_0 K$, wherein $P_0$ corresponds to a normal power or maximal power. Another regulating variable (speed, frequency etc.) which influences the power can be set analogously to the power.

Figure 3A:
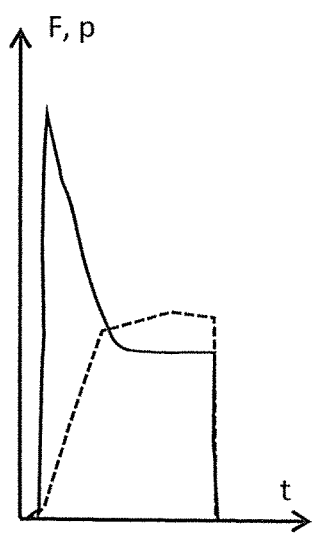
FIG. 3a the measured dependency of the flow and of the pressure, in dependence on time, with a normally functioning brewing process.
Figure 3B:
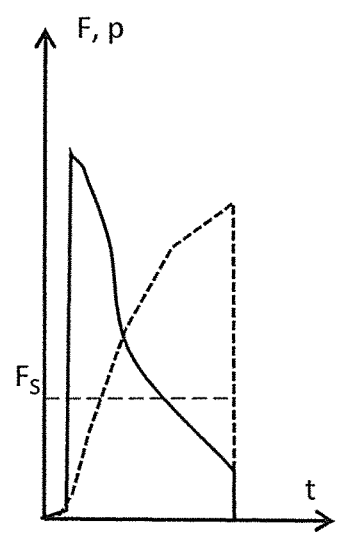
FIG. 3b the measured dependency of the flow and of the pressure, in dependence on time, in the case of a blockage during the brewing process, according to the state of the art.
Figure 2A:
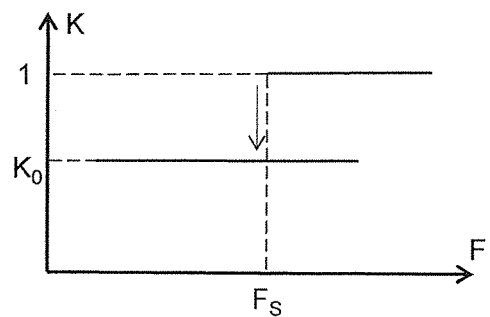
FIG. 2a-2f possibilities of dependencies of a regulating variable correction factor on the measured flow.

According to FIG. 2a, the factor K is reduced from 1 to a value $K_0$, as soon as the flow falls short of a threshold value $F_S$ (see also FIG. 3b). The factor remains at the value $K_0$ independently of the further development of the flow, after the reduction has been effected.

Several steps can also be envisaged, in contrast to FIG. 2a, for example the reduction to $K_1$ on falling short of an upper threshold value, and the reduction to $K_2 < K_1$ on falling short of a lower threshold value.

Figure 2B:
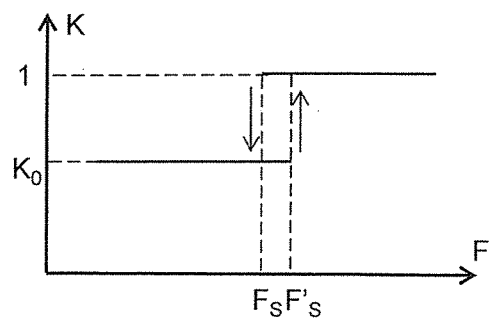

FIG. 2b shows a variant, according to which the factor K is set back to 1 again if the flow then increases again beyond the threshold value after a reduction of K. A hysteresis can be envisaged, as is represented in FIG. 2b, i.e. the setting back to 1 is not effected until exceeding an upper threshold value F's, in order to prevent a rapid switching to and fro. This embodiment can also be generalised onto several steps.

In the embodiments of FIGS. 2a and 2b, the value $K_0$ is smaller than 1 and larger than 0 and, for example, can be between 0.3 and 0.8, in particular between 0.4 and 0.7, especially between 0.5 and 0.6.

Figure 2C:
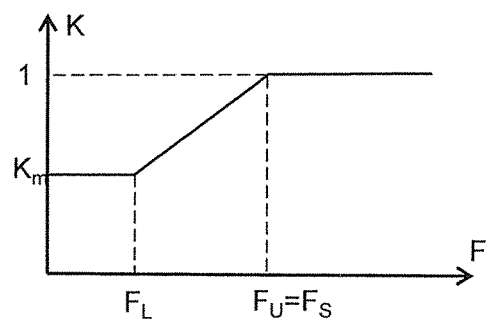

FIG. 2c shows an example of a dependency on K as a continuous function of F. The value K is 1 above an upper threshold value $F_U$, with a linear reduction down to a minimal correction factor $K_m$ at a lower threshold value $F_L$. The value $K_m$ for example can lie between 0.3 and 0.8, in particular between 0.4 and 0.7, especially between 0.5 and 0.6.

Figure 2D:
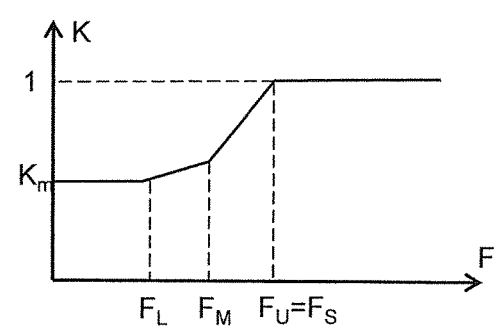
Figure 2E:
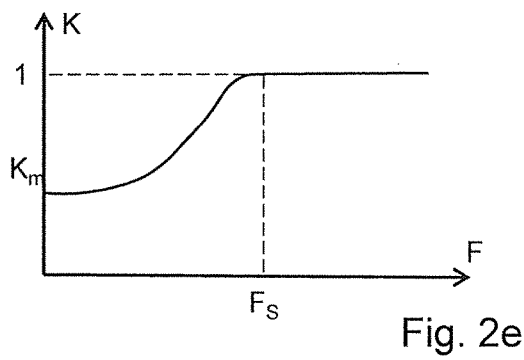

The dependency of the factor on the flow as a function, which is composed of several straight lines having different gradients and which is linear in sections and as a whole is continuous, results in the embodiment according to FIG. 2d. FIG. 2e shows the generalisation onto a continuous, non-linear function.

Figure 2F:
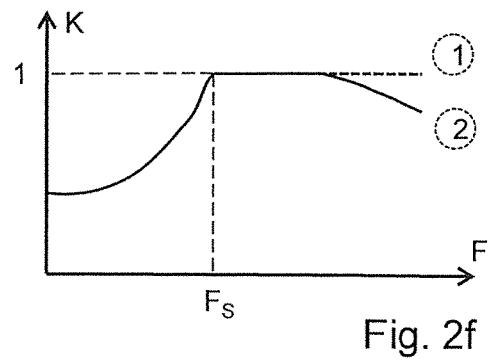
Figure 4:
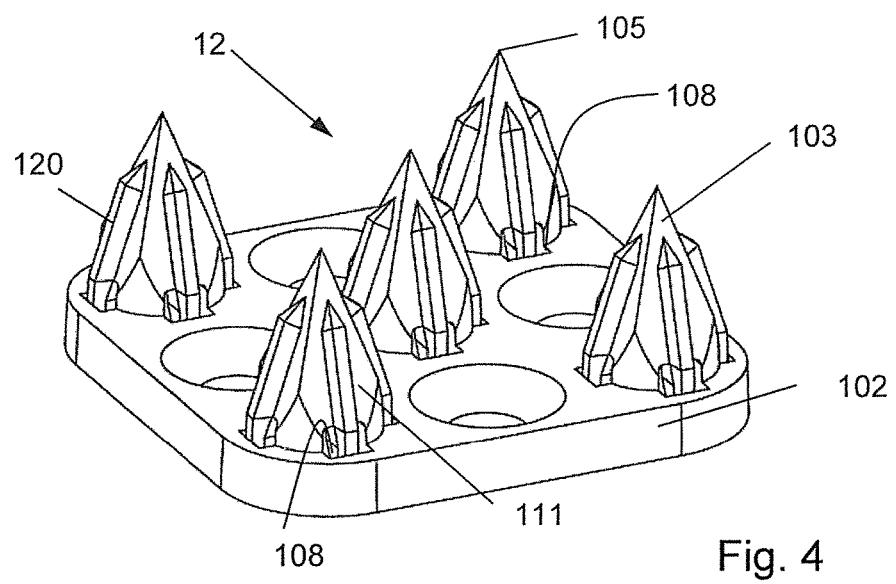
FIG. 4 an extraction-side perforation device.
Figure 5:
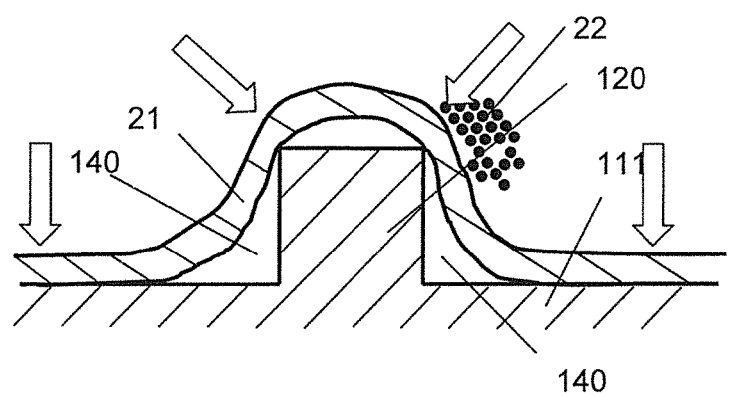
FIG. 5 a cross-sectional representation of a detail of the perforation device of FIG. 4.
Figure 6:
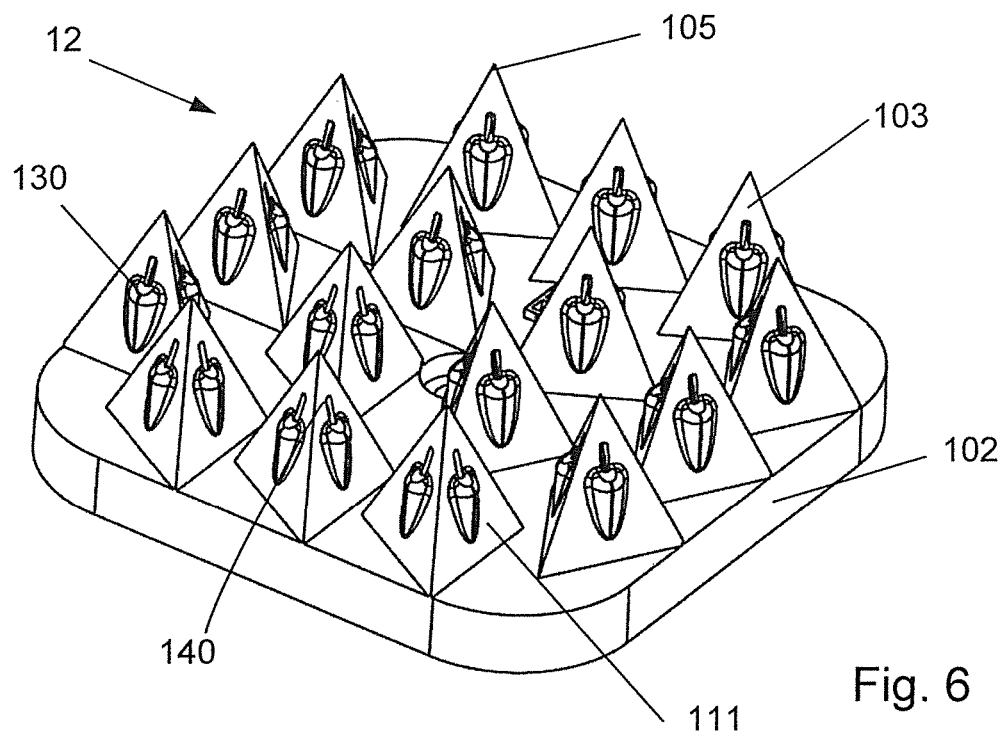
FIG. 6 a different perforation device.
Figure 7:
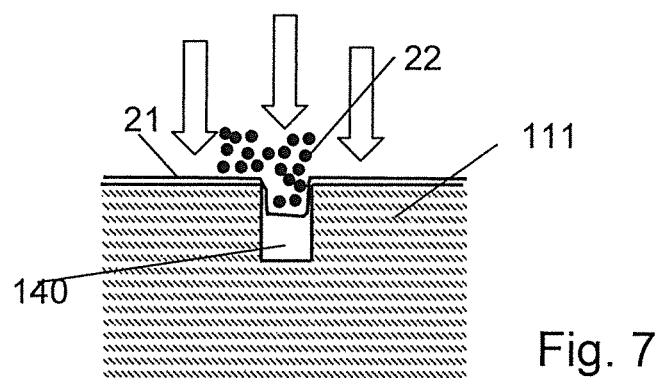
FIG. 7 a cross-sectional representation of a detail of the perforation device of FIG. 6, said representation being analogous to FIG. 5

A dependency K(F), with which the gradient is negative in a region (unbroken line to the very right) is drawn in FIG. 2f. According to this variant therefore, it is possible for the pump power to drop again with very large measured flows.

According to a subvariant, one can optionally also envisage the correction factor remaining at 1 even with large flows (dashed line; (1)), at the very beginning of the brewing process, until the capsule is filled with fluid according to experience, whilst it is reduced (unbroken line; (2)) in a later phase of the brewing process at high measured flows.

Analogously, it would also not be completely ruled out for the pump power to increase again at very small measured flows (to the very left in the picture).

In all embodiments, the respective threshold values, in particular $F_S$, are matched to the respective flow values in normal operation with a brewing without a blockage. In embodiments with steps such as in FIGS. 2a and 2b, the threshold value or the uppermost threshold value, for example, can lie between 50% and 85% of a normal flow (normal flow in the context of the average flow which results after a certain time, after the capsule is filled with water). In embodiments with a continuous course, the uppermost threshold valve $F_U$ for example can lie at a value between 70% and 110% of the normal flow, and a possible lower threshold (FIGS. 2c and 2d) between 0 and maximal 70% of the upper threshold value.

Combinations of the procedural manners according to FIGS. 2a-2f are also conceivable, for example a step-like reduction on falling short of a threshold value, in combination with a linear or non-linear function, etc.

The invention claimed is:

1. An extraction appliance for preparing an extraction product from an extraction material contained in a capsule, said extraction appliance comprising:
   a brewing module that forms a brewing chamber for the capsule,
   a water feed for feeding water under pressure to the brewing chamber, the water feed comprising a pump;
   a controller; and,
   a device that measures a fluid flow of liquid flowing into the brewing chamber;
   wherein the controller is configured and connected to the pump so as to control a pump power of the pump in a manner dependent on the measured fluid flow; and
   wherein the controller is configured to reduce the pump power if the fluid flow falls below a predetermined threshold.

2. The extraction appliance according to claim 1, comprising a water heater and a temperature sensor, wherein the controller is configured to activate the water heater dependent on a temperature measured by the temperature sensor.

3. The extraction appliance according to claim 1, wherein the controller is configured so as to control the pump power dependent solely on the fluid flow.

4. The extraction appliance according to claim 1, wherein the device that measures the fluid flow into the brewing chamber is a flow sensor that is arranged at a feed conduit of the water feed.

5. The extraction appliance according to claim 1, further comprising a capsule recognition module for recognizing the capsule, wherein the controller is configured to control the pump power of the pump dependent on the measured fluid flow in accordance with a program, said program being selected based upon a nature of the recognized capsule.

6. The extraction appliance according to claim 1, wherein the pump power is reduced by a nonzero factor $K_0$ as soon as the fluid flow has fallen short of the predetermined threshold.

7. The extraction appliance according to claim 1, wherein the pump power is adapted by a correcting a power supplied to the pump by multiplying with a correction factor K on falling short of an upper threshold value, wherein said correction factor is a continuous linear function of the fluid flow, at least in an interval.

8. The extraction appliance according to claim 7, wherein the pump power, on falling short of the upper threshold value, runs between 1 and a minimum correction factor $K_m$ at a lower threshold value, in a manner depending on the fluid flow, wherein the value of minimum correction factor $K_m$ is between 0.3 and 0.8.

9. The extraction appliance according to claim 1, wherein the pump power is adapted by a correction factor K on falling short of an upper threshold value, said correction factor being a continuous, non-linear function of the fluid flow.

10. In combination, an extraction appliance according to claim 1 and a portion capsule with an extraction material, wherein a geometry of the portion capsule is matched to the brewing chamber and comprises a capsule wall able to be pierced.

11. The combination according to claim 10, wherein the capsule wall consists of plastic.

12. A method for operating an extraction appliance according to claim 1 for preparing an extraction product from an extraction material contained in a capsule, with a brewing module for forming a brewing chamber for the capsule, with a water feed comprising a pump for feeding water under pressure to the brewing chamber, the method comprising the steps of:
   measuring a fluid flow into the brewing chamber; and,
   controlling a power supplied to the pump in a manner depending on the measured fluid flow during a brewing process;
   wherein the step of controlling is carried out in a manner that the pump power is reduced when the fluid flow falls below a predetermined threshold.

* * * * *